US006255249B1

(12) United States Patent
Voss et al.

(10) Patent No.: US 6,255,249 B1
(45) Date of Patent: Jul. 3, 2001

(54) OXIDATION CATALYST AND METHOD OF USE

(75) Inventors: Kenneth E. Voss, Somerville; Bulent O. Yavuz, Plainfield; Robert J. Farrauto, Westfield; Michael P. Galligan, Clark, all of NJ (US)

(73) Assignee: Engelhard Corporation, Iselin, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/604,233

(22) Filed: Feb. 21, 1996

Related U.S. Application Data

(62) Division of application No. 08/405,279, filed on Mar. 16, 1995, now Pat. No. 6,153,160, which is a division of application No. 08/247,531, filed on May 23, 1994, now Pat. No. 5,491,120, which is a continuation of application No. 07/973,462, filed on Nov. 19, 1992, now abandoned, which is a continuation-in-part of application No. 07/798,437, filed on Nov. 26, 1991, now abandoned.

(51) Int. Cl.[7] .................................................. H01L 21/336

(52) U.S. Cl. ........................ 502/263; 502/262; 502/304; 423/213.5

(58) Field of Search .................................. 502/263, 304, 502/262; 423/213.5

(56) References Cited

U.S. PATENT DOCUMENTS

| 3,161,605 | 12/1964 | Beck et al. . |
| 3,993,572 | 11/1976 | Hindin et al. . |
| 4,021,185 | 5/1977 | Hindin et al. . |

(List continued on next page.)

FOREIGN PATENT DOCUMENTS

| 6769990 | 12/1990 | (AU) . |
| 3340682 | 5/1985 | (DE) . |

(List continued on next page.)

OTHER PUBLICATIONS

Horiuchi et al, "The Effects of Flow–Through Type Oxidation Catalysts . . . ", SAE paper 900600, Feb., 1990.

*Primary Examiner*—John F. Niebling
*Assistant Examiner*—Alexander G. Ghyka
(74) *Attorney, Agent, or Firm*—Richard A. Negin

(57) ABSTRACT

Oxidation catalyst compositions include a catalytic material having a BET surface area of at least about 10 $m^2/g$ and consisting essentially of a combination of bulk ceria and a bulk second metal oxide which may be one or more of titania, zirconia, ceria-zirconia, silica, alumina-silica and α-alumina. The combination may optionally also include activated alumina having a BET surface area of at least about 10 $m^2/g$. The ceria, second metal oxide and optional activated alumina may be mixed together or provided as discrete layers. Optionally, one of platinum or palladium metal may be dispersed on the catalytic material provided that the platinum, when used, is used in limited amounts to preclude excessive oxidation of $SO_2$ to $SO_3$. The catalyst compositions may be used for oxidation of oxidizeable components in a gas-borne stream, e.g., in a method to treat diesel engine exhaust by contacting the hot exhaust with the catalyst composition to promote the oxidation of the volatile organic fraction. The optional inclusion of platinum or palladium promotes the oxidation of gas phase components, e.g., hydrocarbons and carbon monoxide.

30 Claims, 3 Drawing Sheets

U.S. PATENT DOCUMENTS

| | | |
|---|---|---|
| 4,123,391 | 10/1978 | Noguchi et al. . |
| 4,171,289 | 10/1979 | Wheelock . |
| 4,189,404 | 2/1980 | Keith et al. . |
| 4,200,552 | 4/1980 | Noguchi et al. . |
| 4,477,417 | 10/1984 | Domesle et al. . |
| 4,492,769 | 1/1985 | Blanchard et al. . |
| 4,581,343 | 4/1986 | Blanchard et al. . |
| 4,613,583 | 9/1986 | Koch et al. . |
| 4,621,071 | 11/1986 | Blanchard et al. . |
| 4,707,341 | 11/1987 | Koch et al. . |
| 4,714,694 * | 12/1987 | Wan et al. ............................ 502/304 |
| 4,749,671 | 6/1988 | Saito et al. . |
| 4,757,045 | 7/1988 | Turner et al. . |
| 4,759,918 | 7/1988 | Homeier et al. . |
| 4,782,038 | 11/1988 | Gandhi et al. . |
| 4,849,399 | 7/1989 | Joy III et al. . |
| 4,857,088 | 8/1989 | Mizrah et al. . |
| 4,927,799 | 5/1990 | Matsumoto et al. . |
| 4,929,581 | 5/1990 | Steinwandel et al. . |
| 5,000,929 | 3/1991 | Horiuchi et al. . |
| 5,059,575 | 10/1991 | Jorgensen et al. . |
| 5,081,095 | 1/1992 | Bedford et al. . |
| 5,491,120 * | 2/1996 | Voss et al. ........................... 502/304 |

FOREIGN PATENT DOCUMENTS

| | | |
|---|---|---|
| 3737419 | 5/1988 | (DE) . |
| 0251703 | 1/1988 | (EP) . |
| 0377290 | 7/1990 | (EP) . |
| 399891 | 11/1990 | (EP) . |
| 0404385 | 12/1990 | (EP) . |
| 0462593 | 12/1991 | (EP) . |
| 2264180 | 10/1975 | (FR) . |
| 2122912 | 1/1984 | (GB) . |
| 2236493 | 4/1991 | (GB) . |
| 142851 | 8/1984 | (JP) . |

* cited by examiner

OXIDATION CATALYST AND METHOD OF USE

CROSS-REFERENCE TO RELATED APPLICATIONS

This application is a divisional of application Ser. No. 08/405,279, filed Mar. 16. 1995, now U.S. Pat. No. 6,153, 160 which is a divisional of application Ser. No. 08/247,531 filed May 23. 1994, now issued as U.S. Pat. No. 5,491,120, which is a file wrapper continuation of application Ser. No. 07/973,462 filed Nov. 19, 1992, now abandoned, which is a continuation-in-part of application Ser. No. 07/798,437, filed Nov. 26, 1991, now abandoned.

BACKGROUND OF THE INVENTION

1. Field of the Invention

This invention relates to a catalyst composition and method for the oxidation of oxidizeable components of a gas-borne stream, e.g., for treatment of diesel engine exhaust, and more specifically to the treatment of such diesel exhaust to reduce the particulates content thereof.

2. Background and Related Art

As is well-known, gas-borne streams from industrial processes or engine exhausts often contain oxidizeable pollutants such as unburned fuel and vaporized or con-densed oils. For example, diesel engine exhaust contains not only gaseous pollutants such as carbon monoxide ("CO") and unburned hydrocarbons ("HC"), but also soot particles which, as described in more detail below, comprise both a dry carbonaceous fraction and a hydrocarbon liquid which is sometimes referred to as a volatile organic fraction ("VOF"), which terminology will be used herein, or a soluble organic fraction. Accordingly, although sometimes loosely referred to as an "exhaust gas", the exhaust of a diesel engine is actually a heterogeneous material, comprising gaseous, liquid and solid components. The VOF may exist in diesel exhaust either as a vapor or as an aerosol (fine droplets of liquid condensate) depending on the temperature of the diesel exhaust.

Oxidation catalysts comprising a platinum group metal dispersed on a refractory metal oxide support are known for use in treating the exhaust of diesel engines in order to convert both HC and CO gaseous pollutants and particulates, i.e., soot particles, by catalyzing the oxidation of these pollutants to carbon dioxide and water. One problem faced in the treatment of diesel engine exhaust is presented by the presence of sulfur in diesel fuel. Upon combustion, sulfur forms sulfur dioxide and the oxidation catalyst catalyzes the $SO_2$ to $SO_3$ ("sulfates") with subsequent formation of condensible sulfur compounds, such as sulfuric acid, which condense upon, and thereby add to, the mass of particulates. The sulfates also react with activated alumina supports to form aluminum sulfates, which render activated alumina-containing catalysts inactive. In this regard, see U.S. Pat. No. 4,171,289 at column 1, line 39 et seq. Previous attempts to deal with the sulfation problem include the incorporation of large amounts of sulfate-resistant materials such as vanadium oxide into the support coating, or the use of alternative support materials such as alpha-alumina (α-alumina), silica and titania, which are sulfation-resistant materials.

Generally, the prior art has attempted to deal with these problems by dispersing a suitable oxidation catalyst metal, such as one or more platinum group metals, upon a refractory metal oxide support which is resistant to sulfation.

CO-PENDING PARENT APPLICATION

Co-pending parent application Ser. No. 07/798,437 filed Nov. 26, 1991 discloses and claims a catalyst composition and method for the treatment of diesel engine exhaust and co-pending related application Ser. No. 07/973,461, a continuation-in-part of Ser. No. 07/798,437, discloses and claims an oxidation catalyst and method for the oxidative purification of pollutants in gas-borne streams generally, including diesel engine exhaust streams. The catalyst composition comprises a catalytic material consisting essentially of bulk ceria and bulk alumina. Optionally, a low loading (0.1 to 15 g/ft$^3$ of catalyst volume) of platinum or a conventional loading (0.1 to 200 g/ft$^3$ of catalyst volume) of palladium may be incorporated into the catalytic material of the parent applications.

SUMMARY OF THE INVENTION

Generally, in accordance with the present invention, there is provided an oxidation catalyst composition and a method for oxidizing oxidizeable components of a gas-borne stream, e.g., treating diesel engine exhaust in which at least the volatile organic fraction component (described below) of the diesel exhaust particulates is converted to innocuous materials, and in which gaseous HC and CO pollutants may also be similarly converted. The objectives of the invention are attained by an oxidation catalyst comprising a base metal oxide catalytic material consisting essentially of a mixture of high surface area bulk ceria and one or more of the following bulk second metal oxides:

titania, zirconia, ceria-zirconia, silica, alumina-silica and alpha-alumina (α-alumina). The one or more second metal oxides themselves may have a high surface area and, optionally, the catalytic material may further contain a bulk activated alumina. The catalyst composition of the present invention optionally may have dispersed thereon only one of platinum or palladium catalytic metals, for example, a relatively low loading of platinum or a relatively high loading of palladium.

The method of the invention is attained by flowing a gas-borne stream, e.g., a diesel engine exhaust, into contact with the catalyst composition under reaction conditions. Essentially, the compositions of the present invention differ from those of parent application Ser. No. 07/798,437 in that the alumina constituent of the invention described in the parent case is entirely or partly replaced by one or more other second metal oxides.

Specifically, in accordance with the present invention there is provided an oxidation catalyst composition which comprises a refractory carrier on which is disposed a coating of a catalytic material having a BET surface area of at least about 10 m$^2$/g and consisting essentially of a combination of ceria having a BET surface area of at least about 10 m$^2$/g, preferably from about 25 m$^2$/g to 200 m$^2$/g, and a bulk second metal oxide selected from the group consisting of one or more of titania, zirconia, ceria-zirconia, silica, alumina-silica and α-alumina.

In accordance with an aspect of the present invention, the second metal oxide has a BET surface area of at least about 10 m$^2$/g. Another aspect of the invention provides that the composition further comprises activated alumina having a BET surface area of at least about 10 m$^2$/g.

In one aspect of the invention, the ceria and the second metal oxide each comprises from about 5 to 95 percent, preferably from about 10 to 90 percent, more preferably from about 40 to 60 percent, by weight of the combination.

The ceria and the second metal oxide may be combined as a mixture and the mixture deposited as a single layer coating on the refractory carrier, or the ceria and the second metal oxide may be present in respective discrete superimposed layers of ceria and the second metal oxide. The ceria layer may be above or below the second metal oxide layer.

When the activated alumina is present it may be mixed with the ceria and the second metal oxide to form a combined ceria-second metal oxide-alumina coating, or the alumina may be mixed within one or both of discrete ceria and second metal oxide layers. Alternatively, the alumina may be present as a discrete activated alumina layer disposed above or below the ceria and second metal oxide layers, or between them.

Another aspect of the invention provides that the catalyst composition optionally further comprises platinum dispersed on the catalytic material, the platinum being present in the amount of from about 0.1 to 15 g/ft$^3$ of the composition, preferably from about 0.1 to 5 g/ft$^3$ of the composition. When the catalyst composition includes platinum, another aspect of the invention provides that at least a catalytically effective amount of the platinum is dispersed on the ceria; further, at least a catalytically effective amount of the platinum may also be dispersed on the second metal oxide component.

Yet another aspect of the invention provides that the catalyst composition optionally further comprises palladium dispersed on the catalytic material, the palladium preferably being present in the amount of from about 0.1 to 200 g/ft$^3$ of the composition, preferably in the amount of from 20 to 120 g/ft$^3$, more preferably in the amount of from about 50 to 120 g/ft$^3$, of the composition.

Still another aspect of the invention provides that the ceria comprises an aluminum-stabilized ceria.

In accordance with the method of the present invention, there is provided a method of oxidizing oxidizeable components of a gas-borne stream, e.g., a method of treating diesel engine exhaust containing a volatile organic fraction. The method includes contacting the stream with a catalyst composition as described above at a temperature high enough to catalyze oxidation of at least some of the oxidizeable component, e.g., the volatile organic fraction, for example, by contacting the stream or diesel exhaust with the catalyst composition at an inlet temperature of from about 100° C. to 800° C.

DEFINITIONS

As used herein and in the claims, the following terms shall have the indicated meanings.

The term "gas-borne stream" means a gaseous stream which may contain non-gaseous components such as solid particulates and/or vapors, liquid mist or droplets, and/or solid particulates wetted by a liquid.

The term "BET surface area" has its usual meaning of referring to the Brunauer, Emmett, Teller method for determining surface area by $N_2$ absorption. Unless otherwise specifically stated, all references herein to the surface area of bulk ceria, the second metal oxides, or other components means the BET surface area.

The term "activated alumina" has its usual meaning of a high BET surface area alumina, comprising primarily one or more of gamma-, theta- and delta-aluminas (γ-, θ- and δ-aluminas).

The term "catalytically effective amount" means that the amount of material present is sufficient to affect the rate of reaction of the oxidation of pollutants in the exhaust being treated.

The term "inlet temperature" shall mean the temperature of the exhaust, test gas or other stream being treated immediately prior to initial contact of the exhaust, test gas or other stream with the catalyst composition.

The term "ceria-second metal oxide catalytic material" means a combination of ceria and second metal oxides selected from the class consisting of one or more of titania, zirconia, ceria-zirconia, silica, alumina-silica and α-alumina, the ceria having a BET surface area of at least about 10 m$^2$/g, and the average surface area of the combination of high surface area ceria and second metal oxide being at least 10 m$^2$/g.

The term "combination" when used with reference to a combination of (a) bulk ceria and (b) bulk second metal oxide or (c) the foregoing and bulk activated alumina, includes combinations attained by mixtures or blends of (a) and (b) and/or (c) and superimposed discrete layers of (a) and (b) and/or (c).

The term "aluminum-stabilized ceria" means ceria which has been stabilized against thermal degradation by incorporation therein of an aluminum compound. As is well-known, high surface area refractory oxides such as ceria and activated alumina are subject to loss of surface area (thermal degradation) and consequent reduction in catalytic efficiency upon prolonged exposure to high temperatures. A suitable ceria-stabilization technique is shown in U.S. Pat. No. 4,714,694 of C. Z. Wan et al, issued on Dec. 22, 1991, the disclosure of which is incorporated herein. As disclosed in U.S. Pat. No. 4,714,694, ceria particles are impregnated with e.g., an aqueous solution of a soluble aluminum compound such as aluminum nitrate, aluminum chloride, aluminum oxychloride, aluminum acetate, etc. After drying and calcining the impregnated ceria in air at a temperature of, e.g., from about 300° C. to 600° C. for a period of ½ to 2 hours, the aluminum compound impregnated into the ceria particles is converted into an effective thermal stabilizer for the ceria. The term "aluminum-stabilized" ceria is sometimes used although the aluminum is probably present in the ceria as a compound, presumably alumina, and not as elemental aluminum. Of course, ceria may be stabilized against thermal degradation by other means, such as by impregnation with lanthana or zirconia.

Activated alumina, which is optionally employed in bulk form as a component of the second metal oxide, may also be thermally stabilized by a similar impregnation of the alumina with precursors of rare earth metal oxides such as ceria. However, thermal stabilization of the alumina is usually not necessary for the temperatures encountered in treating diesel engine exhaust.

Reference herein or in the claims to ceria, any of the second metal oxides, or alumina as being in "bulk" form means that the ceria, second metal oxides or alumina are present as discrete particles (which may be, and usually are, of very small size, e.g., 10 to 20 microns in diameter or even smaller) as opposed to having been dispersed from solution into particles of another component. For example, the thermal stabilization of ceria particles (bulk ceria) with alumina as described above with respect to U.S. Pat. No. 4,714,694 results in the alumina being dispersed into the ceria particles and does not provide the dispersed alumina in "bulk" form, i.e., as discrete albeit very fine particles of alumina. In the finished product, the bulk particles are consolidated into an adherent coating on the refractory carrier.

The abbreviation "TGA" stands for thermogravimetric analysis which is measure of the weight change (e.g., loss) of a sample as a function of temperature and/or time. The abbreviation "DTA" stands for differential thermal analysis which is measure of the amount of heat emitted (exotherm) or absorbed (endotherm) by a sample as a function of temperature and/or time.

DETAILED DESCRIPTION OF THE INVENTION AND PREFERRED EMBODIMENTS THEREOF

Figure 1:
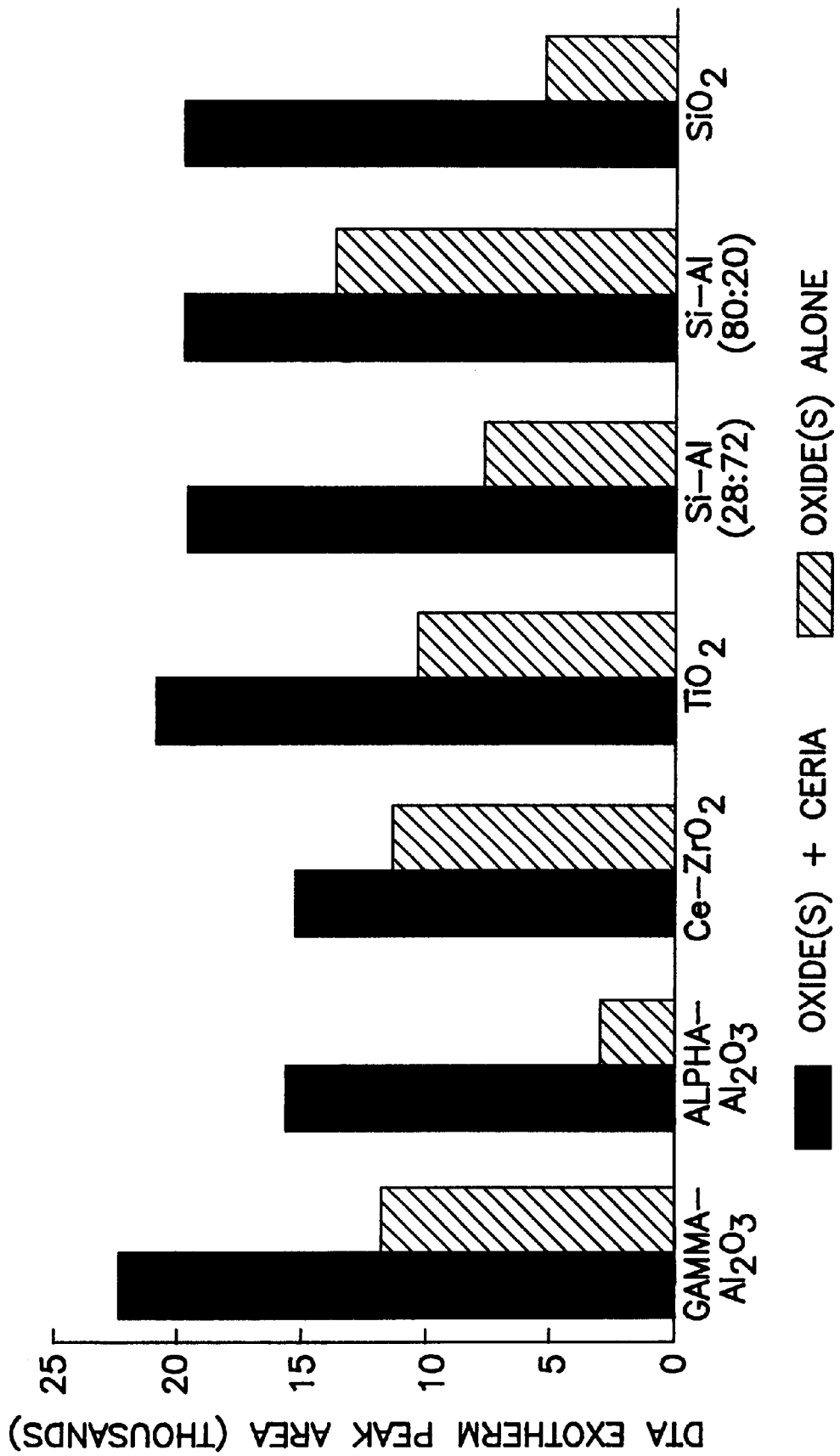
FIG. 1 is a plot comparing the DTA exotherm areas for combustion of lubricating oil catalyzed by, respectively, (a) a platinum-containing embodiment of the catalytic material of the present invention comprising a 1:1 weight ratio mixture of ceria and the indicated second metal oxide, and (b) the second metal oxide alone containing platinum.

The present invention provides an oxidation catalyst composition which is effective for oxidizing oxidizeable components of a gas-borne stream, for example, for treating diesel engine exhaust. In the latter case, the catalyst composition is particularly effective with regard to reducing the total particulates in the exhaust. The carbonaceous particulates ("soot") component of diesel engine exhaust is, as is well-known, comprised of two major components. One component is relatively dry carbonaceous particles and the other, usually referred to as a volatile organic fraction ("VOF") or soluble organic fraction ("SOF"), is a mixture of high molecular weight hydrocarbons comprised of unburned and partially burned diesel fuel and lubricating oil. The volatile organic fraction is present in the diesel exhaust as either a vapor phase or a liquid phase, or both, depending on the temperature of the exhaust. Generally, it is not feasible to attempt to remove or treat the dry, solid carbonaceous particulates component of the total particulates by catalytic treatment, and it is the VOF component which can be most effectively removed by conversion via utilization of an oxidation catalyst. Therefore, in order to reduce the total particulates discharged so as to meet present and impending Government regulations concerning maximum allowable total particulates, the volatile organic fraction, or at least a portion thereof, is oxidized to innocuous $CO_2$ and $H_2O$ by being contacted with an oxidation catalyst under suitable reaction conditions. The required U.S. Government limits for 1991 on HC, CO and nitrogen oxides ("$NO_x$") emissions in diesel engine exhaust have been largely met by suitable engine design modifications. For 1994 the HC, CO and $NO_x$ limits remain unchanged from 1991 standards but the upper limit on total particulates will be reduced from the 1991 level of 0.25 grams per horsepower-hour ("g/HP-hr") to 0.10 g/HP-hr. Although the oxidation catalysts of the present invention, when employed as a diesel exhaust treatment catalyst, are primarily concerned with effectuating a reduction in total particulates, they are also capable, with the optional addition of platinum (in limited amounts) or palladium, of providing the added advantage of also oxidizing a portion of the HC and CO contained in the gaseous component of the diesel engine exhaust. The oxidation catalysts of the present invention also avoid or reduce the unwanted side effect of promoting the oxidation of $SO_2$ to $SO_3$ in diesel exhaust which, as noted above, contributes to the particulates problem because the condensation of sulfuric acid and other sulfate condensibles which accumulate on, and add to, the mass of the particulates in the exhaust.

However, the oxidation catalysts of the present invention have utility for uses other than the treatment of diesel engine exhaust, but are useful for oxidation of gas-borne oxidizeable components generally, such as any application in which lubricating oils are discharged, e.g., the exhaust of compressed natural gas engines, ethanol-fueled engines, compressors, gas turbines, etc. Many alternate-fuel engines such as compressed natural gas engines are built as diesel engine carcasses and therefore inherently discharge significant quantities of lubricating oils.

In accordance with the teachings of the present invention it has been found that the beneficial effect of oxidizing pollutants generally, and in particular of reducing diesel exhaust particulates emissions by oxidation of the volatile organic fraction thereof, can be attained by a catalytic material which is a mixture of one or more selected second metal oxides and a high surface area ceria. For purposes of illustration, the benefits of the present invention will be described in detail below with respect to the treatment of diesel engine exhaust. The basic and novel characteristics of the present invention are believed to reside in the use of the defined combination of ceria and second metal oxide as an oxidation catalyst without the addition of metal catalytic components thereto, except as specifically otherwise defined in certain dependent claims. Preferably, but not necessarily, the bulk second metal oxides, like the ceria, will have a surface area of at least about 10 $m^2/g$, preferably at least about 20 $m^2/g$. For example, the bulk ceria may have a surface area of from about 70 to 150 $m^2/g$. The combination of ceria and the second metal oxide(s) should have a BET surface area of 10 $m^2/g$ or higher. Optionally, up to about 90 percent by weight, e.g., from about 5 to 90 percent by weight, of the total weight of bulk ceria, second metal oxide and activated alumina may be provided by the activated alumina, which may have a BET surface area of 10 $m^2/g$ or higher, preferably at least about 20 $m^2/g$, e.g., a surface area of from about 120 to 180 $m^2/g$. When alumina is present, each of the ceria, alumina and other metal oxide is preferably present in the amount of at least about 5 percent by weight of the total weight of metal oxides present.

A catalyst composition in accordance with the present invention effectively catalyzes the oxidation of the volatile organic fraction so as to provide a significant reduction in total particulates in diesel engine exhaust and exhibits good durability, that is, long life. It should be noted that the prior art generally considers refractory base metal oxides used in diesel oxidation catalysts to be merely supports for the dispersal thereon of catalytically active metals such as platinum group metals. In contrast, the present invention teaches that a ceria-second metal oxide catalytic material consisting essentially of only bulk ceria and one or more selected bulk second metal oxides which provides a mixture of sufficiently high surface area, e.g., at least 10 $m^2/g$, preferably at least 20 $m^2/g$, and dispersed on a suitable carrier, provides a durable and effective diesel oxidation catalyst.

It has further been found that beneficial effects are attained in some circumstances by the optional incorporation of platinum or palladium in the catalyst composition, provided that the platinum is present at loadings much lower than those conventionally used in oxidation catalysts. It has been discovered that, most surprisingly, a limited quantity of platinum in the catalyst composition actually reduces the undesirable oxidation of $SO_2$ to $SO_3$ relative to that encountered by using the ceria-second metal oxide catalytic material alone, while nonetheless promoting some oxidation of CO and HC gaseous components of the diesel exhaust. The suppression of the oxidation of $SO_2$ to $SO_3$ by the addition of very low loadings of platinum, e.g., 0.1 g/ft$^3$, is a very surprising finding, given the powerful catalytic activity of platinum in promoting oxidation reactions generally. Without wishing to be bound by any particular theory, it may be that the presence of a low loading of platinum on the ceria occuppies some catalytic sites on the ceria, thereby moderating the tendency of ceria to promote the oxidation of $SO_2$ to $SO_3$. When palladium is employed, it may be used in much higher loadings than platinum, because palladium even in high loadings, e.g., 50 g/ft$^3$ or more, does not promote excessive oxidation of $SO_2$ to $SO_3$.

If a catalytic metal such as platinum is added to the catalytic composition, it serves to catalyze the oxidation of gas phase HC and CO pollutants as an added benefit. However, such catalytic metal is not needed to supplement the action of the ceria-second metal oxide catalytic material in reducing total particulate emissions. The catalytic metal, be it platinum or palladium, does not appear to play a role in controlling particulates in that the quantity or type of metal (platinum or palladium) utilized in the catalytic material does not significantly affect the rate of particulates conversion. In this regard, see the data presented in parent application Ser. No. 07/798,437, incorporated herein.

The catalysts of the present invention may take the form of a carrier or substrate, such as a monolithic honeycomb structure (a body having a plurality of gas flow passages extending therethrough), on which is applied a coating of the catalytic material comprising a mixture of high surface area ceria and one or more second metal oxides and, optionally, activated alumina and, optionally, platinum or palladium. As discussed below, discrete coatings of the ceria, second metal oxide and alumina may be employed.

The Carrier (Substrate)

The carrier used in this invention should be relatively inert with respect to the catalytic composition dispersed thereon. The preferred carriers are comprised of ceramic-like materials such as cordierite, α-alumina, silicon nitride, zirconia, mullite, spodumene, alumina-silica-magnesia or zirconium silicate, or of refractory metals such as stainless steel. The carriers are preferably of the type sometimes referred to as honeycomb or monolithic carriers, comprising a unitary cylindrical body having a plurality of fine, substantially parallel gas flow passages extending therethrough and connecting both end-faces of the carrier to provide a "flow-through" type of carrier. Such monolithic carriers may contain up to about 700 or more flow channels ("cells") per square inch of cross section, although far fewer may be used. For example, the carrier may have from about 7 to 600, more usually from about 200 to 400, cells per square inch ("cpsi").

While this discussion and the following examples relate to flow-through type carrier substrates, wall-flow carriers (filters) may also be used. Wall-flow carriers are generally similar in structure to flow-through carriers, with the distinction that each channel is blocked at one end of the carrier body, with alternate channels blocked at opposite end-faces. Wall-flow carrier substrates and the support coatings deposited thereon are necessarily porous, as the exhaust must pass through the walls of the carrier in order to exit the carrier structure.

The Catalytic Material

The ceria-second metal oxide catalytic material may be prepared in the form of an aqueous slurry of ceria particles and second metal oxide particles, the particles optionally being impregnated with the platinum or palladium catalytic metal component, if one is to be utilized. The slurry is then applied to the carrier, dried and calcined to form a catalytic material coating ("wash-coat") thereon. Typically, the ceria and second metal oxide particles are mixed with water and an acidifier such as acetic acid, nitric acid or sulfuric acid, and ball milled to a desired particle size.

The optional catalytic metal component, e.g., platinum or palladium, is, when used, preferably dispersed on the ceria particles or on the second metal oxide particles, or on both the ceria and second metal oxide particles. If activated alumina is present as part of the combination of the catalytic material, some or all of the catalytic metal component may be dispersed on it. In such cases, the ceria and/or second metal oxides and/or activated alumina act as both as a catalytic material and a support for the optional catalytic metal component. Such incorporation may be carried out after the ceria-second metal oxide catalytic material is coated as a washcoat onto a suitable carrier, by impregnating the coated carrier with a solution of a compound of the metal, followed by drying and calcination. However, preferably, the ceria particles or both the ceria and second metal oxide particles are impregnated with a compound of the platinum or palladium catalytic metal before a coating of the ceria-second metal oxide catalytic material is applied to the carrier. In either case, the optional platinum or palladium metal may be added to the ceria-second metal oxide catalytic material as a solution of a soluble compound of the metal, the solution serving to impregnate the ceria and second metal oxide particles, which may then be dried and the platinum or palladium fixed thereon. Fixing may be carried out by calcination or by treatment with hydrogen sulfide or by other known means, to render the metal in water-insoluble form.

Generally, the slurry of ceria and second metal oxide particles, and activated alumina if present, whether or not impregnated with the platinum or palladium metal salt solution, will be deposited upon the carrier substrate and dried and calcined to adhere the catalytic material to the carrier and, when the catalytic metal compound is present, to revert the platinum or palladium compound to the elemental metal or its oxide. Suitable platinum or palladium compounds for use in the foregoing process include potassium platinum chloride, ammonium platinum thiocyanate, amine-solubilized platinum hydroxide, chloroplatinic acid, palladium nitrate, and palladium chloride, as is well-known in the art. During calcination, or at least during the initial phase of use of the catalyst, such compounds, if present, are converted into the catalytically active elemental metal or its oxide.

In an alternate catalyst composition design, separate, discrete layers of bulk ceria, bulk second metal oxide and, optionally, bulk activated alumina may be employed. These discrete layers are applied as separate coats superimposed one above the other on the carrier. The order of application of such discrete layers is not important and each layer (of ceria, second metal oxide and, optionally, activated alumina)

may comprise either the first-applied or inner coat or layer, the last-applied or outer coat or layer or, if a third layer is present, the intermediate layer or coat. More than three layers may be used, e.g., a layer of a given material may be repeated or two or more of the second metal oxides may be present as discrete layers of different second metal oxides. When a catalytic metal is present in a catalyst composition in which the catalytic material is present in two or more discrete layers or coats of materials, the catalytic metal may be dispersed in any one or more of the discrete layers or coats.

When the catalytic material is applied as a thin coating or coatings to a suitable carrier, such as described above, the proportions of ingredients are conventionally expressed as weight of material per unit volume of catalyst, as this measure accommodates the presence of different sizes of catalyst composition voids provided by different carrier wall thicknesses, gas flow passage dimensions, etc. Grams per cubic inch ("$g/in^3$") units are used to express the quantity of relatively plentiful components such as the ceria-second metal oxide catalytic material, and grams per cubic foot ("$g/ft^3$") units are used to express the quantity of the sparsely used ingredients, such as the platinum or palladium metal. For typical diesel exhaust applications, the ceria-second metal oxide catalytic material of the present invention generally may comprise from about 0.25 to about 4.0 $g/in^3$, preferably from about 0.25 to about 3.0 $g/in^3$ of the coated carrier substrate, optionally including from about 0 to 25, preferably from about 0 to 15 $g/ft^3$ of platinum or 0 to 200 $g/ft^3$, preferably from about 0 to 120 $g/ft^3$ of palladium.

Without wishing to be bound by a particular theory, applicants offer the following hypothesis to explain the superior performance of the ceria-second metal oxide catalytic materials according to this invention when used to treat diesel engine exhaust. It is believed that diesel exhaust contains a significant proportion of gases or vapors which are close to their dew point, i.e., close to condensing to a liquid, and thereby adding to the VOF portion of the particulates at the conditions obtaining in the exhaust pipe. These "potential particulates" condense in the ceria-second metal oxide catalytic materials, their condensation being enhanced by a capillary condensation effect, a known phenomenon in which a capillary-like action facilitates condensation of oil vapors to liquid phase. The small pore size of the high surface area ceria-second metal oxide catalytic material is believed to provide such capillary condensation action for the VOF. Generally, the higher the surface area of the ceria and alumina, the smaller is their pore size. As the exhaust temperature increases during increased work loads imposed on the diesel engine, the condensed hydrocarbon liquids (condensed VOF) are desorbed from the ceria-second metal oxide catalytic material and volatilize, at which time the catalytic effect of the ceria-second metal oxide catalytic material, which provides numerous acidic sites, is believed to enhance cracking and gas phase oxidation, i.e., combustion, of the desorbed, re-volatilized hydrocarbon (VOF) vapors. Even if a proportion of the vapors re-volatilized from the condensate is not combusted, the cracking of heavy VOF components to lighter hydrocarbons reduces the total amount of condensibles, so that the total particulates output from the diesel engine is concomitantly further reduced. In this latter regard, the ceria-second metal oxide catalytic material is believed to act as a trap and a storage medium for condensed or condensible VOF during relatively cool phases of the exhaust, and releases the cracked VOF only upon re-volatilization thereof during relatively hot phases. The porous nature of the ceria-second metal oxide catalytic material is also believed to promote rapid diffusion of the VOF throughout the washcoat structure, thereby facilitating relatively low temperature gasification and oxidation of the VOF upon increases in temperature of the catalyst during higher engine load (and therefore increased exhaust gas temperature) cycles. Data on aging show that the presence of sulfates does not significantly adversely affect the capacity of the ceria-second metal oxide catalytic material to reduce particulate emissions.

Generally, other ingredients may be added to the catalyst composition of the present invention such as conventional thermal stabilizers for the activated alumina when it is present, e.g., rare earth metal oxides such as ceria. Thermal stabilization of high surface area ceria and alumina to militate against phase conversion to less catalytically effective low surface area forms is well-known in the art although, as noted above, thermal stabilization of alumina is not usually needed for diesel exhaust service. Such thermal stabilizers may be incorporated into the ceria (or activated alumina when it is used) by impregnating the particles with, e.g., a solution of a soluble compound of the stabilizer metal, for example, an aluminum nitrate solution in the case of stabilizing the ceria, and then drying and calcining the impregnated ceria to convert the aluminum nitrate impregnated therein into alumina. In one embodiment, the catalyst composition of the present invention consists essentially only of the high surface area ceria and high surface area second metal oxide, preferably present in a weight proportion of 1.5:1 to 1:1.5, with or without thermal stabilizers impregnated therein, and, optionally, platinum in a limited amount or palladium. The basic and novel characteristic of this invention in believed to reside in the use of the combined ceria and second metal oxide as a catalyst without necessity of the inclusion of precious metal or other catalytic metals except the optional inclusion of platinum or palladium.

EXAMPLES AND DATA

Catalyst compositions in accordance with the present invention may optionally contain an alumina undercoat disposed on the substrate or carrier with the catalyst composition disposed as a coating on the undercoat. However, it is to be understood that the provision of an undercoat on which the catalytic material of the invention is depicted is optional. It is within the purview of the present invention, (as shown by some of the following examples) to deposit the catalytic material directly on the substrate.

To demonstrate the efficacy of catalyst compositions in accordance with the present invention a series of catalyst compositions was prepared according to the following examples using bulk cerium oxide mixed with various other bulk second metal oxides. The weight ratio of ceria to the second metal oxide was 50:50. For comparison purposes comparative catalysts were prepared using the various second metal oxides but without bulk cerium oxide. The catalyst compositions contained the optional precious metal, platinum, at loading levels equivalent to 0.5 $g/ft^3$ or 2.0 $g/ft^3$.

The catalyst compositions were prepared in two forms for testing. Aqueous slurries of the catalytic material were made and used to coat carriers comprised of cordierite carriers as described below. These samples were used for testing the gas phase activity of the catalyst compositions for hydrocarbon (heptane), CO and $SO_2$ conversion using a laboratory reactor system, discussed below. Samples of dried catalytic material powders were also prepared and used to test the lube oil combustion performance of the catalyst composition as a measure of the VOF conversion efficiency of the various samples.

Example 1

A platinum/ceria/γ-alumina catalyst was prepared as follows.

A. γ-alumina (supplied by Condea, their designation SBa-150, having a surface area of 150 m$^2$/g) was impregnated with platinum by adding an aqueous solution of amine-solubilized platinum hydroxide dropwise to the alumina powder with slow mixing (using a dough mixer) in an amount sufficient to bring the alumina powder to incipient wetness and give 0.016 weight percent platinum. (In all the Examples, the weight percent of platinum is based on the total weight of the dried and calcined platinum-impregnated alumina.) This was followed by addition with mixing of about 5 weight percent glacial acetic acid to precipitate and fix the platinum. (In all the Examples, the weight percent of glacial acetic acid is based on the total weight of dried and calcined platinum-impregnated metal oxides.) The platinum-treated γ-alumina was then mixed with sufficient water to give a slurry of about 50 weight percent solids. This slurry was then ball milled to achieve a particle size of about 90% by weight of the particles being finer than 12 microns, which required about 8.5 hours of milling. A small portion of the milled, platinum-treated γ-alumina slurry, designated as Slurry 1A, was dried at 110° C. overnight and then calcined at 450° C. for 2 hours to give Catalyst Powder 1A.

B. Bulk cerium oxide (supplied by SKK, Japan) which had been stabilized against thermal degradation with 2.5% alumina (based on the weight of alumina expressed as a percentage of the weight of the alumina-impregnated ceria) and having a surface area of 143 m$^2$/g was impregnated with platinum by adding an aqueous solution of amine-solubilized platinum hydroxide dropwise with slow mixing to the alumina-stabilized cerium oxide powder in an amount sufficient to bring the cerium oxide powder to incipient wetness and give 0.016 weight percent platinum, based on the total weight of dried platinum-impregnated powder. This was followed by addition with mixing of about 5 weight percent glacial acetic acid to precipitate and fix the platinum. The platinum-treated cerium oxide was then mixed with sufficient water to give a slurry with about 50 weight percent solids. This slurry was then ball milled to achieve a particle size of about 90% finer than 12 microns, which required about 2 hours. This milled, platinum-treated cerium oxide slurry was designated as Slurry 1B.

C. A portion of milled, platinum-treated γ-alumina slurry (Slurry 1A) and a portion of milled, platinum-treated cerium oxide slurry (Slurry 1B) were blended in amounts sufficient to give a mixed slurry with a weight ratio of alumina to ceria of about 50:50. A portion of this mixed slurry of about 50 weight percent solids, designated Slurry 1C, was dried at 110° C. overnight and then calcined at 450° C. for 2 hours to give Catalyst Powder 1C. Slurry 1C was also used to washcoat cordierite honeycomb substrate cores (1.5 inches in diameter×3 inches long) having 400 cells per square inch ("cpsi"). The members were dried at 110° C. overnight and then calcined at 450° C. for 2 hours to give a catalyst with a total washcoat loading of 1.8 g/in$^3$ of catalyst volume and a platinum loading of 0.5 g/ft$^3$ of substrate. This catalyst was designated as Catalyst Member 1C.

Example 2

A platinum/ceria/α-alumina catalyst was prepared as follows.

A. High porosity α-alumina (Allulite foamed α-alumina, supplied by Cabot Corporation) having a surface area of 20 m$^2$/g was impregnated with platinum by the incipient wetness technique used in Example 1 to give 0.029 weight percent platinum on α-alumina. A portion of the platinum-treated α-alumina powder was dried at 110° C. overnight and then calcined at 450° C. for 2 hours to give Catalyst Powder 2A. The platinum-treated α-alumina powder was also added, with mixing, to water along with a silica sol (Nal-co 612) binder at 10% by weight of solids to give a slurry with 25 weight percent total solids content. This slurry was mixed with a mechanical stirrer and not ball milled, so as not to degrade the porous structure of the foamed α-alumina. This slurry was designated as Slurry 2A.

B. The same alumina-stabilized bulk cerium oxide used in Example 1, Part B, was impregnated with platinum using the same technique as in Example 1, Part B, except the platinum-treated cerium oxide contained 0.029 weight percent platinum on alumina-stabilized cerium oxide. A portion of this material was dried at 110° C. overnight and then calcined at 450° C. for 2 hours to give Catalyst Powder 2B. The platinum-treated cerium oxide with 0.029 weight percent platinum was also mixed with water and ball milled as in Example 1 to produce a slurry designated as Slurry 2B.

C. A portion of the platinum-treated α-alumina slurry (Slurry 2A) and a portion of platinum-treated cerium oxide slurry (Slurry 2B) were blended in amounts sufficient to give a mixed slurry with a ratio of α-alumina/silica sol binder to ceria of about 50:50 by weight. This mixed slurry was designated Slurry 2C. A portion of Slurry 2C was dried at 110° C. overnight and then calcined at 450° C. for 2 hours to give Catalyst Powder 2C. Slurry 2C was also used to washcoat cordierite honeycomb substrates (1.5 inches in diameter×3 inches long, 400 cpsi). The members were dried at 110° C overnight and then calcined at 450° C. for 2 hours to give a catalyst with a total washcoat loading of 1.0 g/in$^3$ of substrate and a platinum loading of 0.5 g/ft$^3$ of substrate. This was designated as Catalyst Member 2C.

Example 3

A platinum/ceria/ceria-zirconia catalyst was prepared as follows.

A. Ceria-zirconia powder (supplied by Magnesium Elektron Inc., 12 weight percent ceria) having a surface area of 59 m$^2$/g was impregnated with platinum by the incipient wetness technique used in Example 1. It was dried at 100° C. overnight and then calcined at 450° C. for 2 hours to give a powder containing 0.029 weight percent platinum on ceria-zirconia. This material was designated Catalyst Powder 3A.

B. Ceria-zirconia powder was dry-blended with bulk alumina-stabilized cerium oxide powder (supplied by SKK) in an amount sufficient to give a total ceria to zirconia ratio of about 50:50 by weight. This powder blend was impregnated with platinum by the incipient wetness technique used in Example 1 to give 0.029 weight percent platinum by weight of the mixed solids. The platinum-treated, ceria-zirconia/cerium oxide powder mixture was added to sufficient water to give a slurry with about 45 weight percent solids. This slurry was ball milled for 1 hour and the product was designated Slurry 3B. A portion of Slurry 3B was dried at 110° C. overnight and then calcined at 450° C. for 2 hours to give Catalyst Powder 3B. Slurry 3B was also used to washcoat cordierite honeycomb substrate cores (1.5 inches in diameter×3 inches long, 400 cpsi). The coated substrates were dried at 110° C. overnight and calcined at 450° C. to give a catalyst with a total washcoat loading of 1.0 g/in$^3$ of substrate and a platinum loading of 0.5 g/ft$^3$ of substrate. This was designated as Catalyst Member 3B.

Example 4

A platinum/ceria/titania catalyst was prepared as follows.

A. Titanium powder (supplied by Degussa, designation P-25) having a surface area of 47 $m^2/g$ was impregnated with platinum by the incipient wetness technique used in Example 1 to give 0.029 weight percent platinum on titania. A portion of this product was dried at 100° C. over-night and then calcined at 450° C. to give Catalyst Powder 4A. The platinum-treated titania powder was added to water along with a water soluble methyl-cellulose binder (Methocel, supplied by Dow Chemical) in the amount of 0.25% by weight of solids and mixed to give a 40 weight percent solids slurry which was designated Slurry 4A. The Methocel was added in the form of a 10% aqueous solution. The purpose of the Methocel was to improve the adhesion of the catalyst washcoat to the cordierite substrate.

B. Slurry 4A was blended and mechanically mixed with the platinum-treated cerium oxide containing Slurry 2B to give a mixture containing a titania to ceria ratio of about 50:50 by weight and about 43 weight percent solids. This slurry was designated Slurry 4B. A portion of Slurry 4B was dried at 100° C. overnight and then calcined at 450° C. for 2 hours to give Catalyst Powder 4B. Slurry 4B was also used to washcoat cordierite honeycomb substrate cores (1.5 inches in diameter×3 inches long, 400 cpsi). The coated substrates were dried at 110° C. overnight and then calcined at 450° C. for 2 hours to give a catalyst with a total washcoat loading of 1.0 $g/in^3$ and a platinum loading of 0.5 $g/ft^3$ of substrate. This was designated as Catalyst Member 4B.

Example 5

A platinum/ceria/silica-alumina catalyst with a silica/alumina weight ratio of 28:72 was prepared as follows.

A. A silica-alumina powder was synthesized from silica and alumina-containing aqueous sols. An alumina-coated silica sol (Nalco-612) with 6 weight percent alumina and 24 weight percent silica content was mixed with sufficient alumina sol (Nalco-614) with 10 weight percent alumina to give a silica to alumina weight ratio of 28:72. The mixture was stirred at ambient temperature for 24 hours and then heated to over 50° C. to cause gelation. The gelled mixture was dried at 110° C. overnight and then calcined at 650° C. for 4 hours. This gave a silica-alumina powder having a surface area of 127 $m^2/g$. This powder was then impregnated with platinum via the incipient wetness technique used in Example 1 to give 0.029 weight percent platinum on silica-alumina. Water was added to this mixture to give a slurry with a solids content of about 50 weight percent and the slurry was ball milled to reduce the particle size to less than 12 microns. This slurry was designated as Slurry 5A. A portion of this slurry was dried at 110° C. overnight and then calcined at 450° C. for 2 hours to give Catalyst Powder 5A.

B. Slurry 5A was blended and mechanically mixed with sufficient platinum-treated cerium oxide containing Slurry 2B to give a silica-alumina to ceria weight ratio of about 50:50. This mixed slurry was designated Slurry 5B. A portion of Slurry 5B was dried at 110° C. overnight and then calcined at 450° C. for 2 hours to give Catalyst Powder 5B. Slurry 5B was also used to washcoat cordierite honeycomb substrate cores (1.5 inches in diameter×3 inches long, 400 cpsi). The coated substrates were dried overnight at 110° C. and then calcined at 450° C. for 2 hours to give a catalyst with a total washcoat loading of 1.0 $g/in^3$ of substrate and a platinum loading of 0.5 $g/ft^3$ of substrate. This was designated as Catalyst Member 5B.

Example 6

A platinum/ceria/silica-alumina catalyst with a silica to alumina weight ratio of 80:20 was prepared as follows.

A. A silica-alumina powder was synthesized from silica and alumina-containing aqueous sols. An alumina-coated silica sol (Nalco-612) with 6% alumina and 24% silica content was mixed with sufficient alumina sol (Nalco-614) to give a silica to alumina weight ratio of 80:20. This mixture was stirred for 24 hours and then heated to over 50° C. to cause gelation of the mixture. The gelled product was dried at 110° C. overnight and then calcined at 650° C. for 4 hours. This gave a silica-alumina powder having a surface area of 83 $m^2/g$. This powder was impregnated with platinum via the incipient wetness technique used in Example 2 to give 0.029 weight percent platinum on silica-alumina. The platinum/silica-alumina powder was then mixed with water to give a slurry with solids content of about 50 weight percent. This slurry was ball milled to give a particle size of less than 12 microns. The resultant slurry was designated Slurry 6A. A portion of Slurry 6A was dried at 110° C. overnight and then calcined at 450° C. to give Catalyst Powder 6A.

B. The platinum/silica-alumina containing Slurry 6A was blended and mechanically mixed with sufficient platinum/ceria containing Slurry 2B from Example 2 to give a mixed slurry with ceria to silica-alumina ratio of about 50:50 by weight. This was designated Slurry 6B. A portion of Slurry 6B was dried at 110° C. overnight and then calcined at 450° C. to give Catalyst Powder 6B. Slurry 6B was also used to washcoat cordierite honeycomb substrate cores (1.5 inches in diameter×3 inches long, 400 cpsi). The coated substrates were dried overnight at 110° C. and then calcined at 450° C. for 2 hours to give catalysts with a total washcoat loading of 1.0 $g/in^3$ of substrate and a platinum loading of 0.5 $g/ft^3$ of substrate. This was designated as Catalyst Member 6B.

Example 7

A platinum/ceria/γ-alumina catalyst with a platinum loading of 2.0 $g/ft^3$ of substrate was prepared as follows.

A. A γ-alumina powder (supplied by Condea, designated SBa-150, having a surface area of 150 $m^2/g$) was added to sufficient water to give a slurry with about 50 weight percent solids. The slurry was ball milled for about 0.5 hours. Next, an aqueous solution of amine-solubilized platinum hydroxide was added to give about 0.047 weight percent platinum by weight of γ-alumina. The mixture was then ball milled an additional 5 minutes, following which about 5% glacial acetic acid was added based on the weight of the y-alumina to precipitate and fix the platinum. The resultant slurry was ball milled to achieve a particle size of about 90% finer than 12 microns. The milled, platinum-treated γ-alumina slurry was designated Slurry 7A.

B. Bulk alumina-stabilized cerium oxide powder (supplied by SKK) was added to sufficient water to give a slurry with about 50 weight percent solids. The slurry was ball milled for about 5 minutes. Next, an aqueous solution of amine-solubilized platinum hydroxide was added to give about 0.047% platinum by weight of cerium oxide. This mixture was milled an additional 2 minutes, following which about 5% glacial acetic acid was added based on the weight of cerium oxide to precipitate and fix the platinum. The resultant slurry was ball milled to achieve a particle size of 90% finer than 12 microns. The milled, platinum-treated cerium oxide slurry was designated Slurry 7B.

C. Platinum-treated γ-alumina containing Slurry 7A and platinum-treated cerium oxide containing Slurry 7B were blended and mechanically mixed in sufficient amounts to give a γ-alumina to cerium oxide weight ratio of about 50:50. This mixed slurry was designated Slurry 7C. Slurry 7C was used to washcoat cordierite honeycomb substrate cores (1.5 inches in diameter×3 inches long, 400 cpsi). The coated substrates were dried at 110° C. overnight and then calcined at 450° C. for 2 hours to give a catalyst with a total washcoat loading of 2.5 g/in³ of substrate and a platinum loading of 2.0 g/ft³ of substrate. This sample was designated as Catalyst Member 7C.

Example 8

A platinum/ceria/silica catalyst with a platinum loading of 2.0 g/ft³ of substrate was prepared as follows.

A. A porous, high surface area silica (CS-1022, supplied by PQ Corporation) was jet milled to break up aggregates and give a fine powder consistency. The silica powder was added to sufficient water with mechanical mixing to give a slurry with 21 weight percent solids. To this slurry was added with mixing an aqueous solution of amine-solubilized platinum hydroxide in an amount sufficient to give 0.058% platinum by weight of silica. Next, about 5% glacial acetic acid by weight of the silica was added with mixing to precipitate and fix the platinum. Mechanical mixing was used to prepare this slurry and not ball milling so as not to degrade the porous nature of the silica and to avoid gelation of the silica which occurs during ball milling. This slurry was designated Slurry 8A. A portion of Slurry 8A was dried at 110° C. overnight and then calcined at 450° C. for 2 hours to give Catalyst Powder 8A.

B. Bulk alumina-stabilized cerium oxide powder (supplied by SKK) was added to sufficient water to give a slurry with about 50 weight percent solids. To this slurry was added sufficient amine-solubilized platinum hydroxide solution to give 0.058% platinum by weight of cerium oxide. Next, about 5% glacial acetic acid by weight of cerium oxide was added to the slurry with mixing to precipitate and fix the platinum. This mixture was ball milled to reduce the particle size to less than 12 microns. The milled, platinum/cerium oxide-containing slurry was designated Slurry 8B.

C. Platinum-treated silica containing Slurry 8A was blended and mechanically mixed with sufficient platinum-treated cerium oxide containing Slurry 8B to give a silica to cerium oxide ratio of 50:50 by weight. This mixed slurry was designated Slurry 8C. A portion of Slurry 8C was dried at 110° C. overnight and then calcined at 450° C. for 2 hours to give Catalyst Powder 8C. Slurry 8C was also used to washcoat cordierite honeycomb substrate cores (1.5 inches in diameter×3 inches long, 400 cpsi). The coated substrates were dried at 110° C. overnight and then calcined at 450° C. for 2 hours to give a catalyst with a total washcoat loading of 2.0 g/in³ of substrate and a platinum loading of 2.0 g/ft³ of substrate. This sample was designated as Catalyst Member 8C.

Lube Oil Combustion Test and Test Results

In many diesel engines the VOF in the diesel exhaust consists mainly of diesel lube oil which has been swept from the cylinder walls and comes through valve guides and turbocharger seals. A laboratory test was used to evaluate the relative performance of the catalyst powders prepared in Examples 1–8 for burning diesel lube oil as a model of the VOF in diesel engine exhaust. This test allows for the relative ranking of catalyst materials for their effectiveness of burning lube oil via the interactions between the catalyst and lube oil as they are heated together in air.

Thus, a catalyst powder sample is mixed uniformly with a measured amount of lube oil. In this case, 10% lube oil (Cummins Premium Blue, SAE 15W40) by weight of catalyst powder was used. The mixture of catalyst and lube oil (about 10–30 mg) is placed into the quartz sample pan of a simultaneous TGA/DTA instrument (Thermal Sciences STA 1500) and heated in flowing air using a standard heating ramp (20° C./min.) from ambient temperature to 1000° C.

The collected data, cumulative weight loss (TGA) and heat evolution (DTA) as a function of temperature, are normalized for the weight of catalyst sample and the amount of lube oil present. The total weight loss (TGA) measured is made up of water loss which occurs at about 100° C. or less and lube oil loss either by volatilization or by combustion. The water loss occurs in a discrete step and can be thus differentiated from the lube oil losses. The exotherm (DTA Peak) is a measure of the lube oil loss due to combustion of the lube oil. These data are used to calculate a DTA Peak Area (uV-sec/mg-catalyst sample/mg-lube oil) which is used as the key measure of the catalyst's ability to catalyze the combustion of VOF (lube oil) in this test. Tests have been conducted in which catalyst powders were used to catalyze the combustion of lubricating oil and the same catalytic powders were used to prepare catalysts supported on a substrate. Tests of such catalysts on diesel engine exhausts showed good correlation between the performance of the catalyst powder in the laboratory simulation and the performance of the corresponding catalyst in the engine test.

Other important data resulting from this test are the temperature at which lube-oil weight loss begins (TGA On-set Temperature) and the temperature of the initiation of the exotherm from lube oil burning (DTA Onset Temperature).

The catalyst powders from Examples 1–8 were mixed individually with lube oil and the TGA/DTA lube oil combustion test was run for each. The results of the tests are set forth in TABLE I for the catalysts which were platinum-treated mixtures of bulk cerium oxide with the other metal oxides. The results of the tests for the catalyst powders which did not contain bulk cerium oxide, i.e., platinum-treated metal oxides alone, are set forth in TABLE II.

TABLE I

LUBE OIL COMBUSTION RESULTS - (TGA/DTA) CATALYTIC POWDERS - CERIA PLUS METAL OXIDE

| Cat. Pwd.* | Pt Loading Wt % | Equiv. (g/ft³) | DTA Peak Area K[1] | TGA Onset Temp. (deg C.) | DTA Onset Temp. (deg C.) |
|---|---|---|---|---|---|
| 1C | 0.016 | 0.5 | 22.4 | 225 | 150 |
| 2C | 0.029 | 0.5 | 15.8 | 194 | 151 |
| 3B | 0.029 | 0.5 | 15.5 | 220 | 146 |
| 4B | 0.029 | 0.5 | 21.2 | 211 | 151 |
| 5B | 0.029 | 0.5 | 20.1 | 210 | 160 |
| 6B | 0.029 | 0.5 | 20.6 | 230 | 155 |
| 8C | 0.058 | 2.0 | 20.5 | 222 | 160 |

[1]NOTE:
K = X 1000
a. Ceria = Al-stabilized Ceria (2.5% Al$_2$O$_3$).
b. Ceria/Other Oxide(s) Weight Ratio = about 50:50
c. All samples made as washcoat slips, dried and calcined (450° C., 2 hrs.)
d. Powdered samples mixed with 10 weight percent Lube Oil for TGA/DTA test

*Catalyst Powder   Bulk ceria plus
1C                 γ-Alumina
2C                 α-Alumina-Silica (90:10 weight ratio)
3B                 Ceria-Zirconia (12:88 weight ratio)
4B                 Titania
5B                 Alumina-Silica (72:28 weight ratio)
6B                 Alumina-Silica (20:80 weight ratio)
8C                 Silica

TABLE II

LUBE OIL COMBUSTION RESULTS (TGA/DTA) SINGLE METAL OXIDE

| Cat. Pwd.* | Pt Loading Wt % | Pt Loading Equiv. (g/ft$^3$) | DTA Peak Area K[1] | TGA Onset Temp. (deg C.) | DTA Onset Temp. (deg C.) |
|---|---|---|---|---|---|
| 1A | 0.016 | 0.5 | 11.8 | 237 | 277 |
| 2A | 0.029 | 0.5 | 3.1 | 252 | 195 |
| 3A | 0.029 | 0.5 | 11.5 | 222 | 239 |
| 4A | 0.029 | 0.5 | 10.7 | 199 | 243 |
| 5A | 0.029 | 0.5 | 8.0 | 220 | 250 |
| 6A | 0.029 | 0.5 | 14.2 | 260 | 250 |
| 8A | 0.058 | 2.0 | 5.7 | 272 | 229 |

[1]NOTE:
K = X 1000
a. All samples made as washcoat slips, dried and calcined (450° C., 2 hrs.)
b. Powdered samples mixed with 10 weight percent Lube Oil for TGA/DTA test.
c. Samples in this TABLE for individual Oxide Components impregnated with platinum.
*Catalyst Powder  Oxide
1A  γ-Alumina
2A  α-Alumina-Silica (90:10 weight ratio)
3A  Ceria-Zirconia (12:88 weight ratio)
4A  Titania
5A  Alumina-Silica (72:28 weight ratio)
6A  Alumina-Silica (20:80 weight ratio)
8A  Silica TABLES I and II list the three major parameters determined by the TGA/DTA test, DTA onset temperature, TGA onset temperature and DTA exotherm area. TABLE I shows the results for the Catalytic Powders in accordance with the present invention, whereas TABLE II shows the results for the comparative single-component oxides. FIG. 1 compares the DTA exotherm area of the mixed oxides to that determined for the support oxides. Comparison of TABLE I with TABLE II shows that combination of bulk cerium oxide with other metal oxides results in catalyst compositions with substantially higher DTA Peak Areas, and therefore VOF burning capability, than for catalysts containing those metal oxides alone. This effect is also shown in a graphical comparison in FIG. 1.

The catalysts containing bulk cerium oxide with either titania, alumina-silica (72:28), alumina-silica (20:80) and silica showed comparable DTA Peak Areas with one another, >20K, (K=1000) and were also comparable with the comparative catalyst of Example 1 containing bulk cerium oxide with γ-alumina (22.4K). Those catalysts containing bulk cerium oxide with a-alumina or ceria-zirconia exhibited the next highest set of DTA Peak Areas (>15.5K) which were greater than any of the catalysts containing the metal oxides with no bulk cerium oxide.

Comparison of TABLE I with TABLE II also shows that in some cases catalysts containing a combination of bulk cerium oxide with other metal oxides exhibited initial weight losses associated with lube oil (TGA Onset Temperatures) at temperatures which were lower than for catalysts containing the metal oxides but with no bulk cerium oxide. For silica the difference was 50° C. Titania and ceria-zirconia were exceptions to this behavior. This effect is also shown in a graphical comparison in FIG. 2.

Comparison of TABLE I with TABLE II also shows that catalysts containing a combination of bulk cerium oxide with other metal oxides exhibited substantially lower temperatures for the initiation of the exotherm associated with lube oil combustion (DTA Onset Temperature) than for catalysts containing the metal oxides with no bulk cerium oxide. In the case of alumina-silica (20:80 weight ratio) the difference was as great as 95° C. Regardless of the DTA Onset Temperature of the catalysts containing the metal oxides alone, the catalysts containing bulk cerium oxide with the metal oxides exhibited lower DTA Onset Temperatures in the narrow range 146 to 160° C. This effect is also shown in a graphical comparison in FIG. 3.

Comparison of the TGA Onset Temperatures and the DTA Onset Temperatures in TABLES I and II shows that the exo-therm associated with burning of the lube oil is initiated at a lower temperature than that for the initiation of appreciable weight loss associated with lube oil burning. This at first appears to be a contradiction. However, the probable explanation is that initiation of the exotherm is associated with loss/abstraction and burning of hydrogen from the lube oil in contact with the catalyst and that loss of hydrogen with its low mass is not measured as an appreciable weight loss by TGA. This explanation is supported by mass spectrum measurements made during TGA/DTA lube oil combustion tests which show evolution of water as a by-product of combustion at the same temperature as the DTA Onset.

Figure 2:
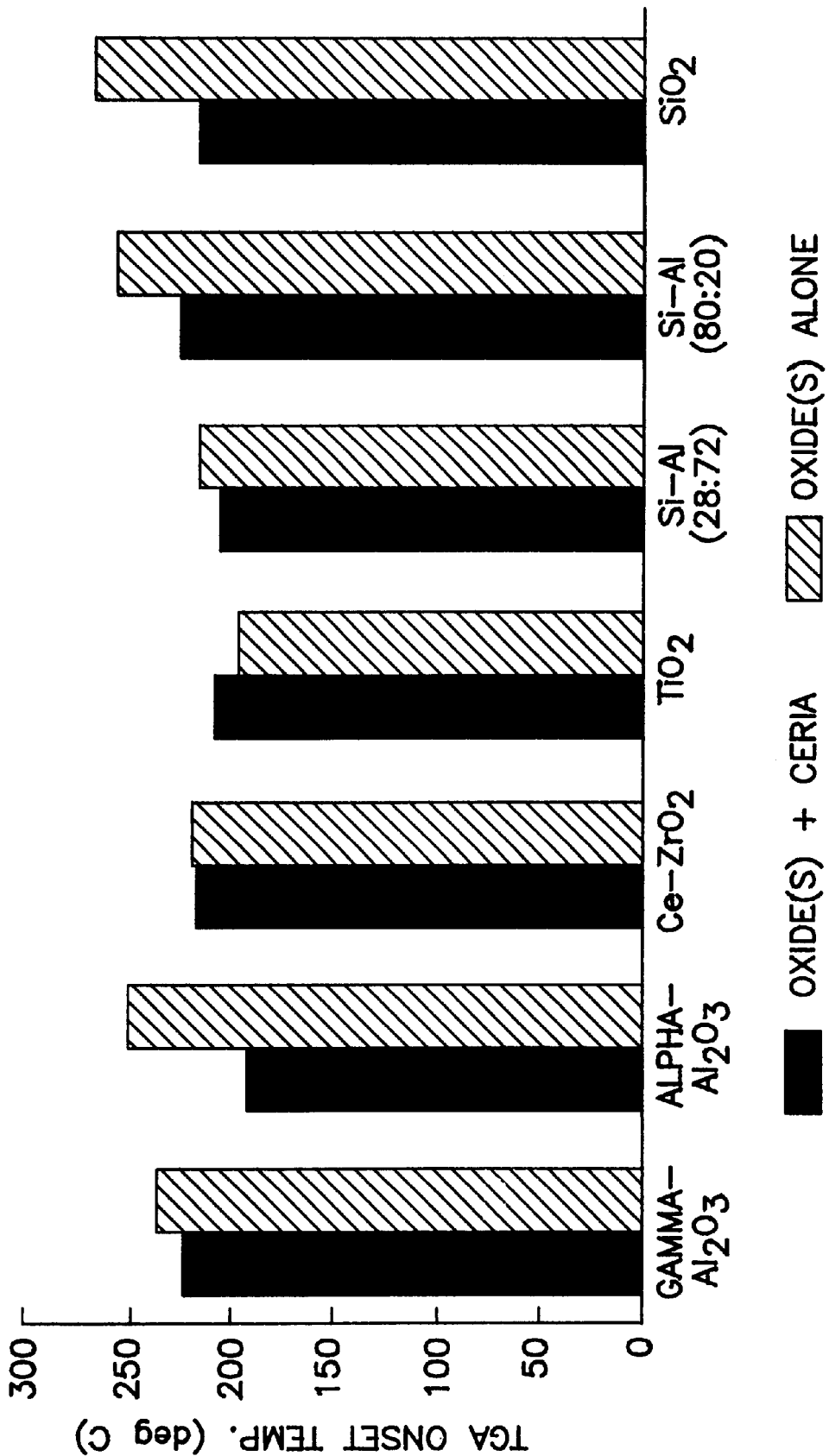
FIG. 2 is a plot comparing the TGA onset temperatures for combustion of lubricating oil catalyzed by, respectively, (a) a platinum-containing embodiment of the catalytic material of the present invention comprising a 1:1 weight ratio mixture of ceria and the indicated second metal oxide, and (b) the second metal oxide alone containing platinum.
Figure 3:
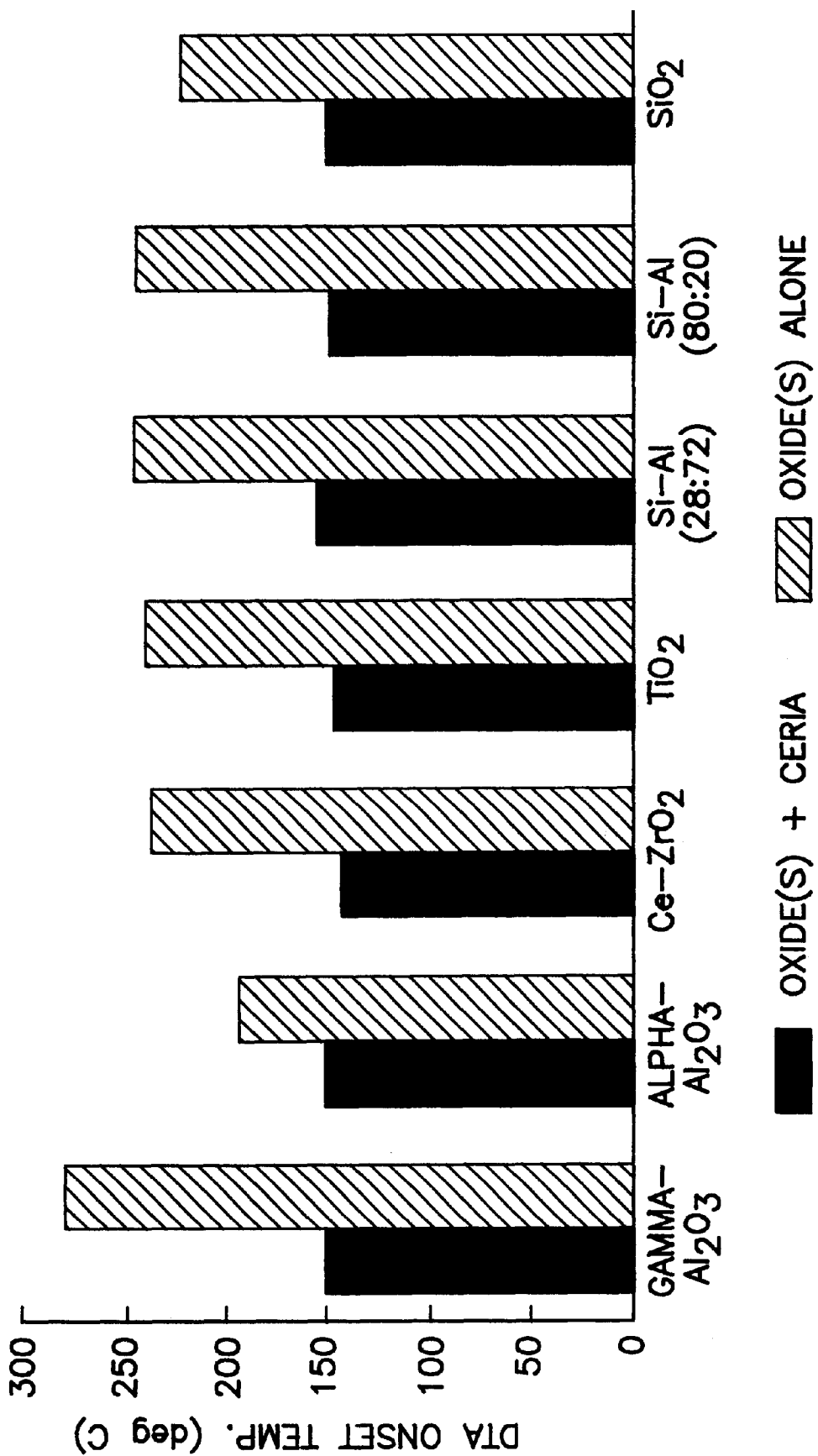
FIG. 3 is a plot comparing the DTA onset temperatures for combustion of lubricating oil catalyzed by, respectively, (a) a platinum-containing embodiment of the catalytic material of the present invention comprising a 1:1 weight ratio mixture of ceria and the indicated second metal oxide, and (b) the second metal oxide alone containing platinum.

The TGA/DTA results shown in TABLES I and II and in FIGS. 1 through 3 demonstrate that catalysts containing bulk cerium oxide mixed with other metal oxides are more effective for burning a greater fraction of lube oil (VOF) and with initiation of the burning at a lower temperature than for catalysts containing those metal oxides alone.

Gas Phase Activity and Test Results

Catalyst Members 1–8 were tested to assess the relative gas phase oxidation activity for HC, SO$_2$ and CO as a function of temperature using a simulated diesel exhaust in a quartz-tube type laboratory diagnostic reactor heated by an electric furnace. Each of Catalyst Members 1–8 was aged before testing in a flowing stream of 500° C. air having a ten percent by volume water-vapor content for ten hours. The aged samples were then each separately evaluated using a flowing stream of a simulated diesel exhaust having the composition:

| | |
|---|---|
| 10% water vapor, | 28.57 ppm Heptane, |
| 10% O$_2$, | 200 ppm CO, |
| 4.5% CO$_2$, | 50 ppm SO$_2$, |
| 1000 ppm NO, | balance nitrogen. |

(The percents given above are volume percents and "ppm" means parts per million by volume. The 28.57 ppm heptane is equivalent to 200 ppm C$_1$ hydrocarbons.) Conversion of the CO (to CO$_2$) of the SO$_2$ (to SO$_3$) and of the heptane (to CO$_2$ and H$_2$O) were determined simultaneously as the differences between the concentrations of those components at the inlet and outlet of each catalyst tested. Determinations were made at four temperature levels, 275° C., 350° C., 425° C. and 500° C. and at a space velocity of 50,000 volumes of the simulated diesel exhaust (at standard conditions of temperature and pressure) per volume of catalyst per hour. The results of this test are shown in TABLE III, Parts A through C. Reference in TABLE III, or elsewhere in this application, to a percentage conversion of constituents (rendered as "%C" in TABLE III) of the exhaust or test gas, means the percentage of such constituent initially present in the exhaust or test gas being treated which is converted to another species. Thus, if an exhaust contains 50 parts per million ("ppm") volume SO$_2$ and treatment of the exhaust results in oxidizing 10 ppm of the SO$_2$ to SO$_3$, a 20 percent conversion of the SO$_2$ has been sustained. Reference in this application to "space velocity" means the flow rate of exhaust or test gas flowed through a catalyst, expressed as volumes of exhaust or test gas per volume of catalyst per hour, calculated with the exhaust or test gas at standard conditions of temperature and pressure.

TABLE III

Part A
Gas Phase Activity By Diagnostic Reactor

| Cat. Mbr.* | Pt Loading Equiv. (g/ft$^3$) | Total Washcoat Loading Equiv. (g/in$^3$) | SO$_2$ Conversion (% C) Temperature (° C.) | | | |
|---|---|---|---|---|---|---|
| | | | 275 | 350 | 425 | 500 |
| 1C | 0.5 | 1.8 | 0.0 | 3.0 | 3.5 | 9.9 |
| 2C | 0.5 | 1.0 | 0.0 | 1.2 | 5.1 | 8.3 |
| 3B | 0.5 | 1.0 | 0.0 | 5.0 | 24.0 | — |
| 4B | 0.5 | 1.0 | 0.0 | 6.0 | 16.0 | 26.0 |
| 5B | 0.5 | 1.0 | 1.6 | 4.9 | 9.7 | 18.3 |
| 6B | 0.5 | 1.0 | 0.0 | 4.4 | 9.6 | 15.0 |
| 7C | 2.0 | 2.5 | 7.6 | 25.6 | 32.4 | 37.3 |
| 8C | 2.0 | 2.0 | 5.1 | 20.0 | 32.7 | 43.8 |

| *Catalyst Member | Bulk ceria plus |
|---|---|
| 1C | γ-Alumina |
| 2C | α-Alumina |
| 3B | Ceria-Zirconia (12:88 weight ratio) |
| 4B | Titania |
| 5B | Alumina-Silica (72:28 weight ratio) |
| 6B | Alumina-Silica (20:80 weight ratio) |
| 7C | γ-Alumina |
| 8C | Silica |

TABLE III

Part B
Gas Phase Activity By Diagnostic Reactor

| Cat. Mbr.* | Pt Loading Equiv. (g/ft$^3$) | Total Washcoat Loading Equiv. (g/in$^3$) | HC Conversion (% C) Temperature (° C.) | | | |
|---|---|---|---|---|---|---|
| | | | 275 | 350 | 425 | 500 |
| 1C | 0.5 | 1.8 | 1.4 | 12.2 | 26.8 | 31.7 |
| 2C | 0.5 | 1.0 | 0.0 | 10.9 | 27.5 | 38.9 |
| 3B | 0.5 | 1.0 | 2.0 | 79.0 | 87.0 | — |
| 4B | 0.5 | 1.0 | 0.0 | 39.0 | 55.0 | 60.5 |
| 5B | 0.5 | 1.0 | 3.3 | 46.2 | 59.6 | 57.0 |
| 6B | 0.5 | 1.0 | 0.0 | 32.5 | 47.4 | 50.0 |
| 7C | 2.0 | 2.5 | 7.5 | 72.5 | 76.4 | 78.8 |
| 8C | 2.0 | 2.0 | 7.1 | 47.5 | 71.8 | 67.2 |

| *Catalyst Member | Bulk ceria plus: |
|---|---|
| 1C | γ-Alumina |
| 2C | α-Alumina |
| 3B | Ceria-Zirconia (12:88 weight ratio) |
| 4B | Titania |
| 5B | Alumina-Silica (72:28 weight ratio) |
| 6B | Alumina-Silica (20:80 weight ratio) |
| 7C | γ-Alumina |
| 8C | Silica |

TABLE III

Part C
Gas Phase Activity By Diagnostic Reactor

| Cat. Mbr.* | Pt Loading Equiv. (g/ft$^3$) | Total Washcoat Loading Equiv. (g/in$^3$) | CO Conversion (% C) Temperature (° C.) | | | |
|---|---|---|---|---|---|---|
| | | | 275 | 350 | 425 | 500 |
| 1C | 0.5 | 1.8 | 24.0 | 55.5 | 61.1 | 61.5 |
| 2C | 0.5 | 1.0 | 38.0 | 79.0 | 83.0 | 84.0 |
| 3B | 0.5 | 1.0 | 79.0 | 98.0 | 98.0 | — |
| 4B | 0.5 | 1.0 | 73.0 | 89.0 | 94.0 | 96.6 |
| 5B | 0.5 | 1.0 | 76.7 | 94.9 | 96.3 | 96.5 |
| 6B | 0.5 | 1.0 | 57.8 | 87.8 | 89.0 | 92.5 |
| 7C | 2.0 | 2.5 | 92.9 | 99.2 | 99.2 | 98.9 |
| 8C | 2.0 | 2.0 | 90.0 | 96.0 | 98.1 | 98.8 |

| *Catalyst Member | Bulk ceria plus: |
|---|---|
| 1C | γ-Alumina |
| 2C | α-Alumina |
| 3B | Ceria-Zirconia (12:88 weight ratio) |
| 4B | Titania |
| 5B | Alumina-Silica (72:28 weight ratio) |
| 6B | Alumina-Silica (20:80 weight ratio) |
| 7C | γ-Alumina |
| 8C | Silica |

TABLE III, Part A shows the results for SO$_2$ conversion as a function of temperature for the catalysts containing bulk cerium oxide mixed with various other metal oxides. Because oxidation of SO$_2$ to SO$_3$ in a diesel exhaust can add to the exhaust particulate emissions in the form of sulfuric acid mist ("sulfate-make"), an effective diesel exhaust catalyst should oxidize as little SO$_2$ as possible, especially at high exhaust temperatures. TABLE III, Part A shows that SO$_2$ conversion is affected by platinum loading (compare 0.5 with 2.0 g/ft$^3$), even for the unconventionally low platinum levels used in accordance with this invention. Catalyst Member 7C (2.0 g/ft$^3$ Pt) has been shown to exhibit superior control of "sulfate-make" when compared to commercial diesel catalysts having conventional platinum loading levels, e.g., 40–50 g/ft$^3$ (see Parent Case). Thus, even the highest SO$_2$ conversion levels shown in TABLE III, Part A are not considered excessive.

For the catalysts with 0.5 g/ft3 platinum, the lowest SO$_2$ conversion levels were exhibited by the sample containing α-alumina (Catalyst Member 2C) which was roughly comparable to the sample according to the Parent Case containing γ-alumina (Catalyst Member 1C). The samples containing alumina-silica (20:80 weight ratio, Catalyst Member 6B), alumina-silica (72:28 weight ratio, Catalyst Member 5B), titania (Catalyst Member 4B), and ceria-zirconia (Catalyst Member 3B) gave the next highest SO$_2$ conversion levels with the latter two being slightly higher at temperatures of 425 and 500° C.

The catalysts with 2.0 g/ft$^3$ platinum exhibited higher levels of SO$_2$ conversion, but the sample containing silica (Catalyst Member 8C) exhibited roughly comparable performance with the comparative y-alumina-containing sample (Catalyst Member 7C) of the Parent Case.

TABLE III, Part B shows the HC (heptane) conversion as a function of temperature. Based on the results for catalysts with 0.5 g/ft$^3$ platinum, the sample containing ceria-zirconia (Catalyst Member 3B) showed the highest level of HC conversion. The next highest levels were exhibited by the samples containing titania (Catalyst Member 4B) and alumina-silica (72:28 weight ratio, Catalyst Member 5B) which were comparable. The sample containing alumina-silica (20:80 weight ratio, Catalyst Member 6B) showed a slightly lower HC conversion level. The samples containing γ-alumina (Parent Case) and α-alumina were generally comparable and exhibited the lowest HC conversion.

For catalysts containing 2.0 g/ft$^3$ platinum, the sample containing y-alumina (Catalyst Member 7C) made according to the Parent Case showed overall slightly better HC conversion than the sample containing silica (Catalyst Member 8C).

The results show that different metal oxides in combination with bulk cerium oxide exhibit substantially different levels of HC conversion. For the catalysts with 0.5 g/ft³ platinum, each of the metal oxides, with the exception of α-alumina, gave a catalyst exhibiting higher HC conversion levels than the catalyst of the Parent Case made with γ-alumina (Catalyst Member 1C). Further, the catalyst containing ceria-zirconia showed higher HC conversion at 350 and 425° C. than the catalyst of the Parent Case (Catalyst Member 7C), inspite of having only 25% as much platinum.

TABLE III, Part C shows CO conversion as a function of temperature for the catalysts containing bulk cerium oxide mixed with various other metal oxides. For the catalysts with 0.5 g/ft³ platinum, the samples containing ceria-zirconia (Catalyst Member 3B), alumina-silica (72:28 weight ratio, Catalyst Member 5B) and titania (Catalyst Member 4B) were comparable and gave the highest CO conversion. The sample containing alumina-silica (20:80 weight ratio, Catalyst Member 6B) was next with a slightly lower CO conversion at the lowest temperature tested (i.e., higher "light-off" temperature). The sample containing α-alumina (Catalyst Member 2C) gave the next highest level of CO conversion and the catalyst of the Parent Case containing γ-alumina (Catalyst Member 1C) exhibited the lowest CO conversion of the group, but ultimately attained at least 55% conversion at 350° C. and above. For the catalysts with 2.0 g/ft³ platinum, the sample made according to the Parent Case and containing y-alumina (Catalyst Member 7C) and the sample containing silica (Catalyst Member 8C) were comparable exhibiting over 90% conversion of CO at all temperatures tested.

The gas phase activity results discussed above demonstrate that the type of metal oxide which is mixed with bulk cerium oxide and treated with low loadings of platinum to make a catalyst according to this invention can have a marked effect on the level of HC and CO conversion. Proper choice of that metal oxide can provide catalysts with better performance for HC and CO activity than that of the Parent Case containing γ-alumina. The effects on $SO_2$ conversion are of a lesser magnitude because of the lower conversion levels attained which is due to the unique low platinum loading levels used. The TGA/DTA test results demonstrate that bulk cerium 30 oxide is the key catalytic component when mixed with other metal oxides to achieve the most extensive burning of lube oil (VOF) and with the lowest possible onset temperature.

While the invention has been described in detail with respect to specific preferred embodiments thereof it will be appreciated that variations thereto may be made which nonetheless lie within the scope of the invention and the appended claims.

What is claimed is:

1. An oxidation catalyst composition composition a refractory carrier on which is disposed a coating of a catalytic material consisting essentially of a combination of bulk ceria having a BET surface area of at least about 10 m²/g and a bulk second metal oxide selected from the group consisting of one or niore oF titania, zirconia, ccria-zirconia, silica, alumina-silica, and α-alumina, the catalytic material havilig a BET surface area of at least about 10 m²/g, in the absencc of a platinum group metal.

2. The catalyst composition of claim 1 wherein the ceria and second metal oxide each comprises from about 5 to 95 percent by weight of the combination.

3. The catalyst composition of claim 1 wherein the second metal oxide has a BET surface area of at least about 10 m²/g and the composition further comprises activated alumina having a BET surface area of at least about 10 m²/g as part of the combination.

4. The catalyst composition of claim 3 wherein the ceria, the second metal oxide and the activated alumina each comprises at least about 50 percent by weight of the combination.

5. The catalyst composition of claim 1, claim 2 or claim 3 wherein the ceria, the second metal oxide and, when present, bulk activated alumina, are each disposed in respective discrete layers one overlying the other.

6. The catalyst composition of claim 1 or claim 3 wherein the ceria comprises an aluminum-stabilized ceria.

7. The catalyst composition of claim 1 or claim 2 wherein the ceria and second metal oxide each comprises from about 40 to 60 percent by weight of the combination.

8. The catalyst composition of claim 1 or claim 3 wherein the ceria has a BET surface area of from about 25 m²/g to 200 m²/g.

9. A catalyst composition for purifying diesel engine exhaust, the composition comprising a refractory carrier on which is disposed a coating of a catalytic material consisting essentially of a combination of (a) bulk ceria having a BET surface area of at least about 10 m²/g, (b) a bulk second metal oxide sclected from the class consisting of one or more of titania, zirconia, ceria-zirconia, silica, alumina-silica, and α-alumina, and (c) from 0.5 to 15 g/ft³ of platinium dispersed on tle catalytic material,
   the ceria and the second metal oxide each comprising from about 5 to 95 percent by weight of the combination and the catalytic material having a BET surface area of at least 10 m²/g.

10. A catalyst composition for purifying diesel engine exhaust, the composition comprising a refractory carrier on which is disposed a coating of a catalytic material consisting essentially of a combination of (a) bulk ceria having a BET surface area of at least about 10 m²/g, (h) a bulk second metal oxide selected from the class consisting of one or more of titania, zirconia, ceria-zirconia, silica, alumina-silica, and α-aluminiia, and (c) a catalytically effective amount of a metal selected from the group consisting of platinum present in the amount of from about 0.5 to 15 g/ft³ of the composition and palladium present in the amount of from about 0.1 to 200 g/ft³ of the composition,
   the ceria and the second mctal oxide each comprising from about 5 to 95 percent by weight of the combination, the catalytic metal bcing dispersed on the coating, and the catalytic material having a BET surface area of at least 10 m²/g.

11. The catalyst composition of claim 10 wherein the catalytic metal is platinum and at least a catalytically effective amount of the platinum is dispersed on the ceria.

12. The catalyst composition of claim 1, claim 3, claim 9 or claim 10 wherein the ceria and the second metal oxide are disposed in respective discrete layers, one of which overlies the other.

13. A catalyst composition for purifying diesel engine exhaust, the composition comprising a refractory carrier on which is disposed a coating of a catalytic naterial consisting essentially of a combination of (a) bulk ceria having a BET surface area of at least about 10 m²/g, (b) a bulk second metal oxide having a BET surface area of at least 10 m²/g and selected from the class consisting of one or more of titania, zirconia, ceria-zirconia, silica, alumina-silica, ant α-alumina, (c) bulk activated alumina having a BET surface area of at least about 10 m²/g, and (d) 0.5 to 15 g/ft³ of platinum dispersed on the catalytic material, the ceria and the second metal oxide each comprising from about 5 to 95 percent by weight of the combination.

14. The catalyst composition of claim 9, claim 10 or claim 13 wherein the ceria and second metal oxide each comprises from about 10 to 90 percent by weight of the combination.

15. The catalyst composition of claim 9, claim 10 or claim 13 wherein the ceria and the second metal oxide each comprises from about 40 to 60 percent by weight of the combination.

16. The calalyst composition of claim 9 or claim 13 wherein the platinum is present in the amount of fronm about 0.5 to 5 g/ft³.

17. The catalyst composition of claim 10 wherein the palladium is present in the amount of from about 20 to 120 g/ft³.

18. The catalyst composition of claim 17 wherein the ceria comprises aluminum-stabilized ceria.

19. The catalyst composition of claim 9 wherein the platinum is present in an amount up to 0.5 g/ft³.

20. The catalyst composition of claim 9 wherein the platinum is present in an amount from 0.5 to 5.0 g/ft³.

21. The catalyst composition of claim 1 wherein the weight proportion of the ceria to the second metal oxide is from 1.5:1 to 1:1.5.

22. The catalyst composition of claim 9 wherein the weight proportion of the ceria to the second metal oxide is from 1.5:1 to 1:1.5.

23. The catalyst composition of claim 1, claim 9, claim 10 or claim 13 wherein the ceria comprises aluminum-stabilized ceria.

24. The catalyst composition of claim 1, claim 9, claim 10 or claim 13 wherein one or both of the ceria and alumina are stabilized.

25. The catalyst composition of claim 10 further comprising platinum dispersed on the catalytic material, the platinum being present in the amount of from about 0.1 to 15 g/ft³ of the composition.

26. The catalyst composition of claim 16 wherein at least a catalytically effective amount of the platinum is dispersed on the bulk ceria.

27. The catalyst composition of claim 26 wherein at least a catalytically effective amount of the platinum is dispersed on the second metal oxide.

28. The catalyst composition of claim 10 further comprising palladium dispersed on the catalytic material, the palladium being present in the amount of from about 0.1 to 200 g/ft³ of the composition.

29. The catalyst composition of claim 28 wherein the palladium is present in the amount of from about 50 to 120 g/ft³ of the composition.

30. The catalyst composition of claim 20 wherein the platinum is present in an amount of from 0.5 to 2.0 g/ft³.

* * * * *